US012010561B2

(12) United States Patent
Shrestha et al.

(10) Patent No.: US 12,010,561 B2
(45) Date of Patent: *Jun. 11, 2024

(54) TRANSMISSION OF GROUP HANDOVER MESSAGE

(71) Applicant: QUALCOMM Incorporated, San Diego, CA (US)

(72) Inventors: Bharat Shrestha, San Diego, CA (US); Prasad Reddy Kadiri, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,618

(22) Filed: Dec. 8, 2022

(65) Prior Publication Data

US 2023/0107577 A1    Apr. 6, 2023

Related U.S. Application Data

(63) Continuation of application No. 17/386,390, filed on Jul. 27, 2021, now Pat. No. 11,558,786.

(60) Provisional application No. 63/061,640, filed on Aug. 5, 2020.

(51) Int. Cl.
*H04W 36/00* (2009.01)
*H04L 1/1607* (2023.01)
*H04W 12/03* (2021.01)
*H04W 12/0431* (2021.01)
*H04W 84/06* (2009.01)

(52) U.S. Cl.
CPC ....... *H04W 36/0009* (2018.08); *H04L 1/1621* (2013.01); *H04W 12/03* (2021.01); *H04W 12/0431* (2021.01); *H04W 84/06* (2013.01)

(58) Field of Classification Search
None
See application file for complete search history.

(56) References Cited

U.S. PATENT DOCUMENTS

| 2015/0181481 | A1 | 6/2015 | Masini et al. |
| 2015/0245255 | A1 | 8/2015 | Van et al. |
| 2018/0279188 | A1 | 9/2018 | Tenny et al. |

(Continued)

OTHER PUBLICATIONS

CATT: "Beam Management and Other Aspects for NTN", 3GPP TSG RAN WG1 #104-e, 3GPP Draft, R1-2100384, 3rd Generation Partnership Project (3GPP), Mobile Competence Centre, 650, Route Des Lucioles, F-06921 Sophia-Antipolis Cedex, France, vol. RAN WG1 , No. e-Meeting, Jan. 25, 2021-Feb. 5, 2021, Jan. 19, 2021 (Jan. 19, 2021), 8 Pages, XP051970987, p. 1-p. 8.

(Continued)

*Primary Examiner* — Otis L Thompson, Jr.
(74) *Attorney, Agent, or Firm* — Procopio, Cory, Hargreaves & Savitch LLP

(57) ABSTRACT

Methods, apparatuses, and computer readable medium for enabling an efficient group handover mechanism that has less signaling overhead than single UE handover are provided. An example method at a base station includes transmitting a group handover request for the group of UEs to a target base station. The method further includes receiving a group handover acknowledgment from the target base station. The method further includes transmitting a group handover message to the group of UEs.

29 Claims, 12 Drawing Sheets

(56) References Cited

U.S. PATENT DOCUMENTS

| | | | |
|---|---|---|---|
| 2019/0037449 | A1 | 1/2019 | Fujishiro et al. |
| 2019/0082367 | A1 | 3/2019 | Lin et al. |
| 2020/0053795 | A1 | 2/2020 | Lin et al. |
| 2020/0314914 | A1 | 10/2020 | Roy et al. |
| 2020/0389822 | A1* | 12/2020 | Liu ................... H04W 36/18 |
| 2021/0045093 | A1 | 2/2021 | Rao et al. |
| 2021/0136641 | A1 | 5/2021 | Roy et al. |
| 2021/0185733 | A1 | 6/2021 | Agiwal et al. |
| 2022/0046486 | A1 | 2/2022 | Shrestha et al. |
| 2022/0167216 | A1* | 5/2022 | Kolekar ............... H04W 36/08 |
| 2022/0353950 | A1* | 11/2022 | Chen ................... H04W 76/32 |

OTHER PUBLICATIONS

Ericsson (Email Discussion Rapporteur): "[POST111e][910][NTN] Impacts of Earth Fixed and Moving Beams (Ericsson)", 3GPP TSG-RAN WG2 Meeting #112, 3GPP Draft, R2-2009820, 3rd Generation Partnership Project (3GPP), Mobile Competence Centre, 650, Route Des Lucioles, F-06921 Sophia-Antipolis Cedex, France, vol. RAN WG2, Oct. 23, 2020 (Oct. 23, 2020), 45 Pges, XP051942634, p. 1-p. 43.

Huawei., et al., "TP for Group Mobility", 3GPP TSG-RAN WG2 #98, 3GPP Draft, R2-1705862 TP for Group Mobility, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 19, 2017 (May 19, 2017), pp. 1-3, XP051285826, p. 1-p. 3.

International Search Report and Written Opinion—PCT/US2021/043547—ISA/EPO—dated Mar. 31, 2022.

Mediatek Inc: "Broadcast Handover in LEO-Satellite Based NTN", 3GPP TSG-RAN WG2 Meeting #107-Bis, 3GPP Draft, R2-1912964_Broadcast Handover in NTN, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 3, 2019 (Oct. 3, 2019), 3 Pages, XP051804041, p. 1-p. 3.

Partial International Search Report—PCT/US2021/043547—ISA/EPO—dated Feb. 10, 2022.

Samsung: "Discussion on Enhancements for Feeder Link Switch Over", 3GPP TSG-RAN3 Meeting #111, 3GPP Draft, R3-210511, 3rd Generation Partnership Project (3GPP), Mobile Competence Centre, 650, Route Des Lucioles, F-06921 Sophia-Antipolis Cedex, France, vol. RAN WG3, No. Electronic meeting, Jan. 25, 2021-Feb. 4, 2021, Jan. 15, 2021 (Jan. 15, 2021), 4 Pages, XP051968955, p. 1-p. 4.

Samsung: "Discussion on RACH Issue in Feeder Link Switch Over", 3GPP TSG-RAN3 Meeting #109-e, 3GPP Draft, R3-205405, 3rd Generation Partnership Project (3GPP), Mobile Competence Centre, 650, Route Des Lucioles, F-06921 Sophia-Antipolis Cedex, France, vol. RAN WG3, No. Electronic Meeting, Aug. 17, 2020-Aug. 28, 2020, Aug. 7, 2020 (Aug. 7, 2020), 3 Pages, XP051916071, p. 1-p. 3.

* cited by examiner

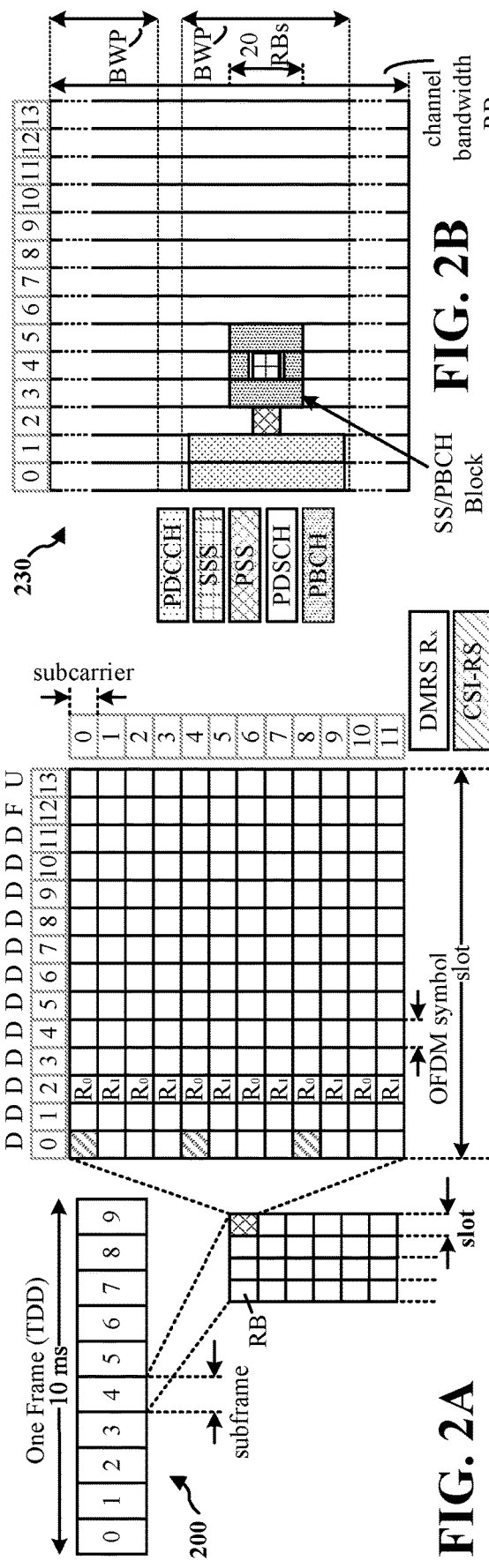
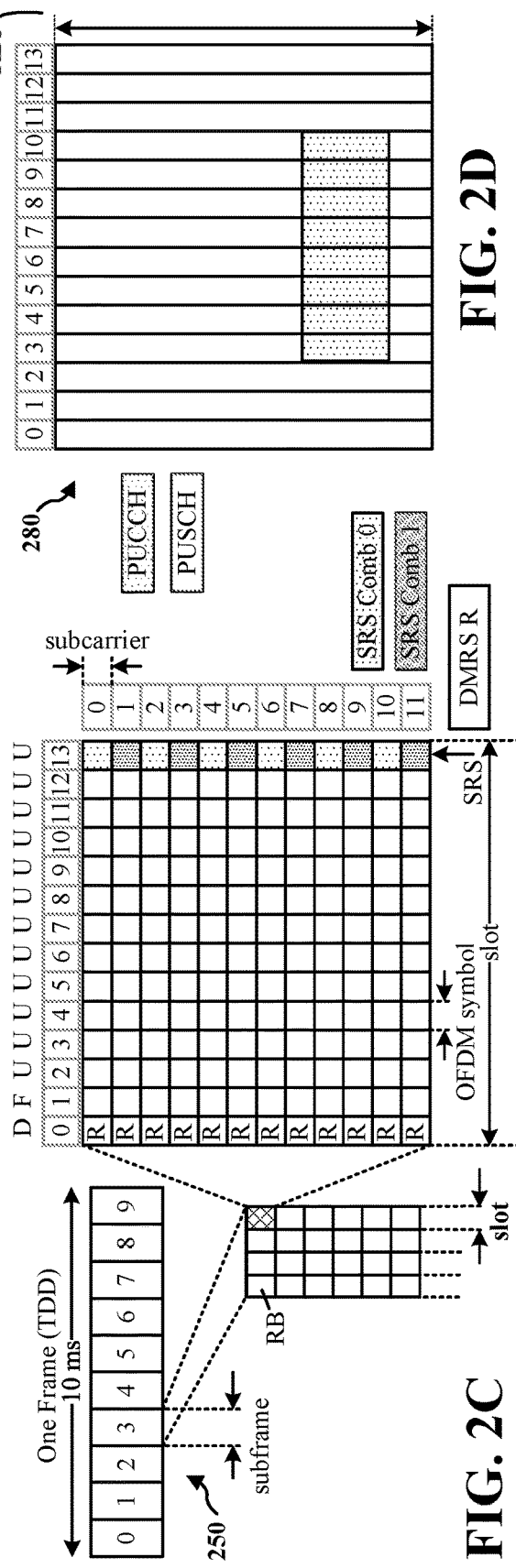
FIG. 2A
FIG. 2B
FIG. 2C
FIG. 2D

TRANSMISSION OF GROUP HANDOVER MESSAGE

CROSS REFERENCE TO RELATED APPLICATION(S)

This application is a Continuation of U.S. Non-provisional application Ser. No. 17/386,390, entitled "TRANSMISSION OF GROUP HANDOVER MESSAGE" and filed Jul. 27, 2021, which claims the benefit of and priority to U.S. Provisional Application Ser. No. 63/061,640, entitled "TRANSMISSION OF GROUP HANDOVER MESSAGE" and filed on Aug. 5, 2020, which are expressly incorporated by reference herein in their entirety.

BACKGROUND

Technical Field

The present disclosure relates generally to communication systems, and more particularly, to a wireless communication system with a handover mechanism.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Satellites may be integrated in a 5G communication system to facilitate the communication between a base station and a UE. For example, a transparent satellite that performs amplification, spatial filtering, or frequency conversion may relay communication transmitted from a base station to UEs. When a transparent satellite moves, it may need to switch the feeder link because the base station associated with the feeder link may be out of coverage for the satellite. Therefore, UEs served by the satellite may need to be handed over to another base station. Existing handover mechanisms that handover each UE individually is inefficient for this type of handover.

Methods, apparatuses, and computer readable medium for enabling an efficient group handover mechanism that has less signaling overhead than single user equipment (UE) handover are provided.

In one aspect of the disclosure, a method, a computer-readable medium, and an apparatus are provided for wireless communication at a base station. The base station transmits a group handover request for the group of UEs to a target base station and receives a group handover acknowledgment from the target base station. The base station transmits a group handover message to the group of UEs.

In another aspect of the disclosure, a method, a computer-readable medium, and an apparatus are provided for wireless communication at a UE. The UE receives a group handover message comprising RRC configuration for one or more UEs transmitted to a group of UEs comprising the one or more UEs from the source base station and connects to a target base station using the RRC configuration based on the group handover message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
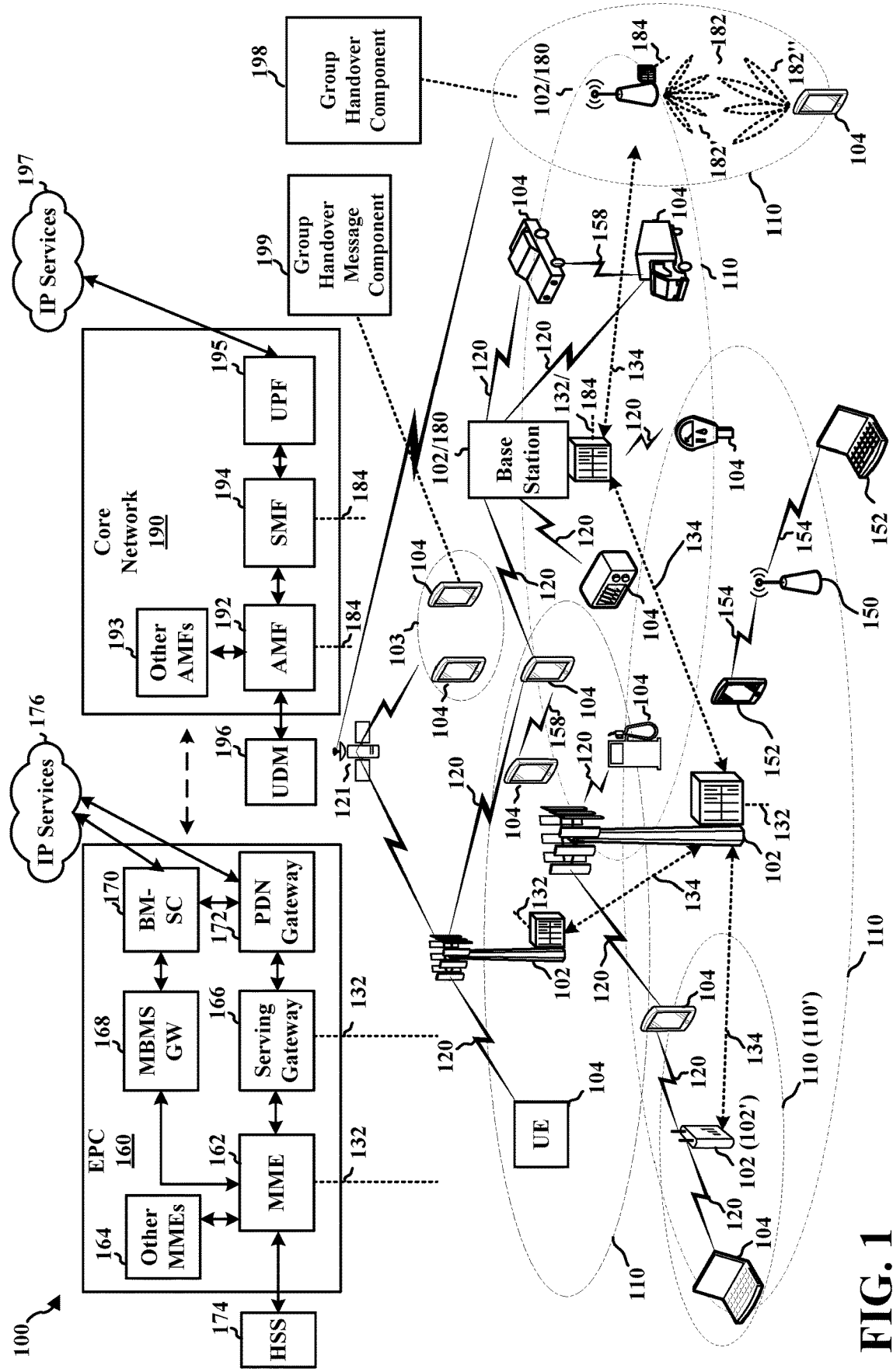
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102 or 180 may include a group handover component 198 that configured to perform a group handover of a group of UEs 103 that includes at least two UEs 104 to another base station 102 or 180. For example, if the base station 102 or 180 communicates with a group of UEs 104 via the satellite 121, as the satellite 121 moves out of coverage of the base station 180, the base station 180 may hand over the group of UEs 104 to another base station 102. The group handover component 198 may be configured to transmit a group handover request for the group of UEs 103 to a target base station (e.g., base station 102 or 180), receive a group handover acknowledgment from the target base station, and transmit a group handover message to the group of UEs 103.

Each UE 104 served by the base station 102 or 180 may include a group handover message component 199 configured to receive a group handover message comprising RRC configuration for one or more UEs transmitted to a group of UEs comprising the one or more UEs from the source base station connect to a target base station using the RRC configuration based on the group handover message.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms)

may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
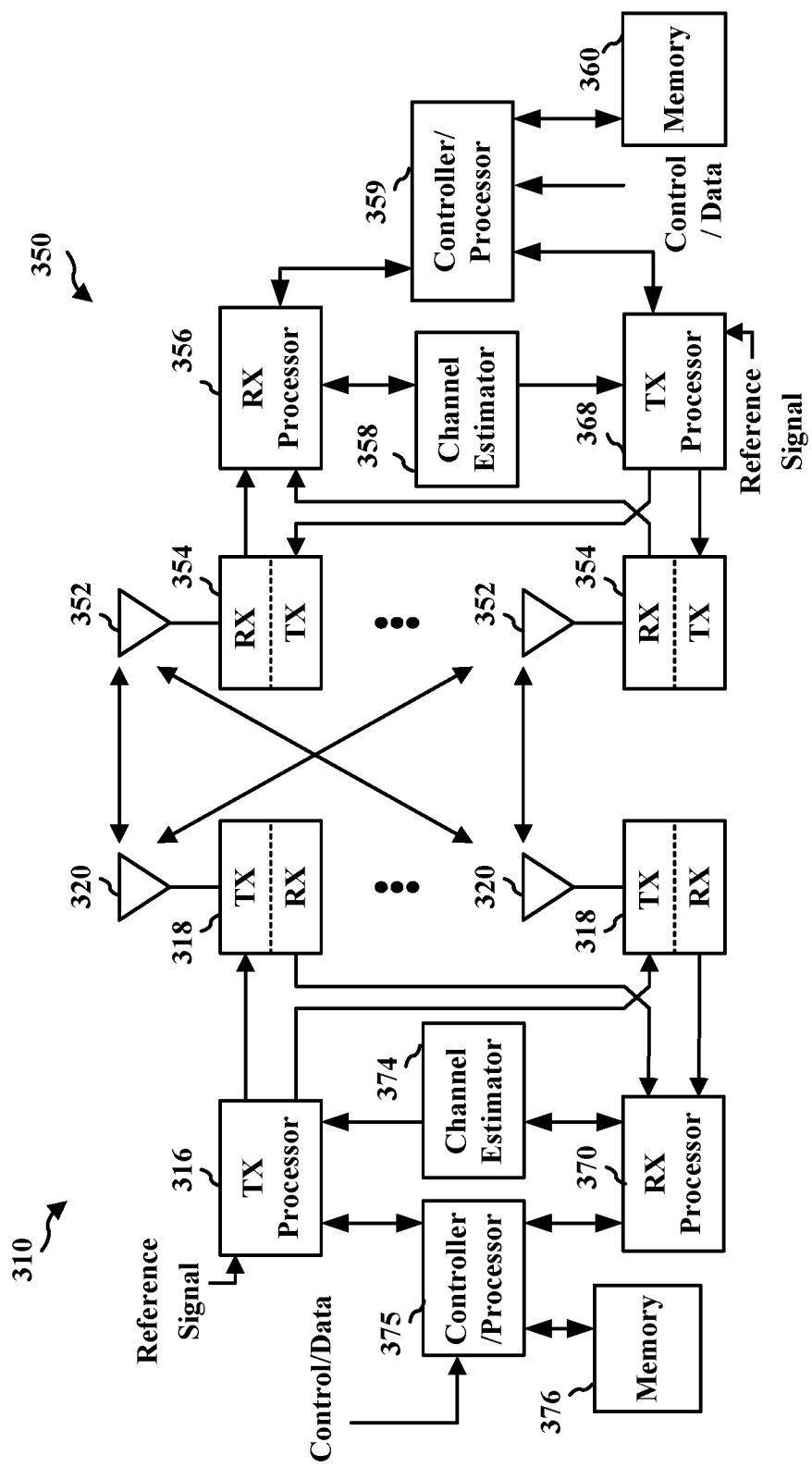
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with group handover message component 199 of FIG. 1.

At least one of the TX processor 316, the RX processor 370, and the controller/processor 375 may be configured to perform aspects in connection with group handover component 198 of FIG. 1.

As illustrated in FIG. 1, a wireless communication system may integrate one or more satellite 121 to facilitate the communication between a base station and a UE. For example, a transparent satellite may relay communication transmitted from a base station to UEs to extend the coverage of the base station to UEs outside of a transmission range of the base station. The satellite may perform amplification, spatial filtering, or frequency conversion when relaying communication between the base station and the UE. A link between the base station serving the UE and the satellite may be referred to as a feeder link. When a transparent satellite moves, it may need to switch the feeder link because the base station associated with the feeder link is no longer in the coverage of the satellite. Therefore, UEs served by the satellite may need to be handed over to another base station (which may be referred to as a target base station and the prior base station may be referred to as a source base station). A handover mechanism that individually hands over each UE by transmitting a dedicated handover message (e.g., command) to each UE may be inefficient and would involve sending handover messages to the entire group of UEs served by the source base station via the satellite. Additionally, each UE in the group of UEs attempting to connect to the target base station using individually stored handover messages may lead to congestion at the target base station. If each UE in the group of UEs does not store the handover message and instead relies on the currently serving base station (which may be referred as a source base station) to transmit the handover messages, the separate handover message for each UE in the group of UEs increase system overhead.

Figure 4A:
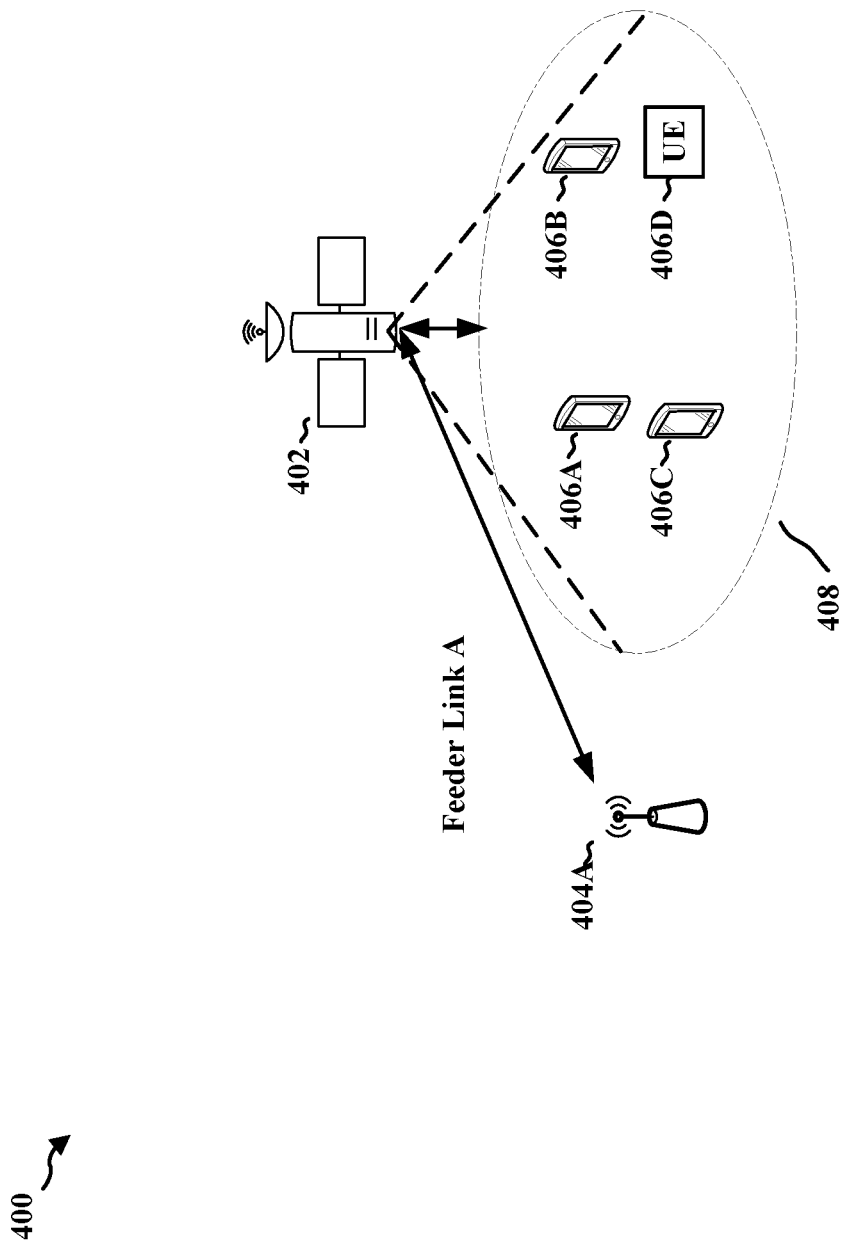
FIGS. 4A and 4B illustrate example wireless communication environments with a satellite.
Figure 4B:
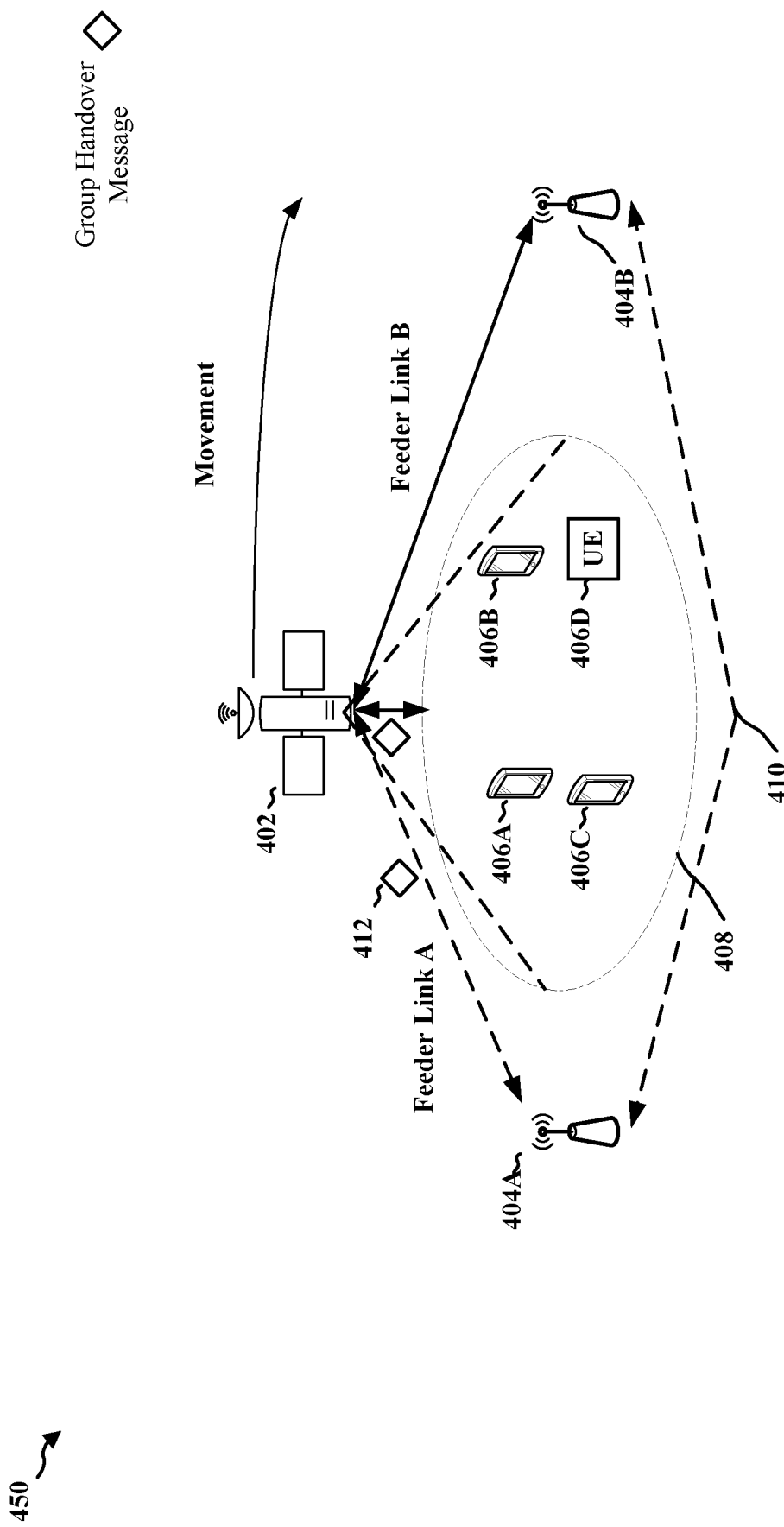

FIGS. 4A and 4B illustrate example wireless communication environments 400 and 450 with a satellite. As illustrated in FIG. 4A, a satellite 402 may be an intermediary for communication between a base station 404A and a group of UEs 408 including one or more UEs 406A, 406B, 406C, and 406D. Four UEs are shown for illustrative purpose. The base station 404A may transmit a signal encoding data, such as user data or control data for any UE in the group of UEs 408, to the satellite 402. The satellite 402 may relay the data, such as by performing amplification, spatial filtering, or frequency conversion, to one or more UEs in the group of UEs 408. Any UE in the group of UEs 408 may communicate with the base station 404A by transmitting a signal encoding data, such as user data of the UE, to the satellite 402. The satellite 402 may then relay the data, such as by performing amplification, spatial filtering, or frequency conversion, to the base station 404A. The communication (i.e., radio link) between the base station 404A and the satellite 402 may be referred to as a feeder link A. In some aspects, the satellite 402 is a transparent satellite that is configured to perform amplification, spatial filtering, or frequency conversion. In some aspects, the satellite 402 is a regenerative satellite that may additionally perform other signal processing for relaying such as decoding, interference cancellation, signal regeneration but does not have the full functionality of a base station.

As illustrated in FIG. 4B, as the satellite 402 moves (e.g., by orbiting around the Earth), the satellite 402 may move out of a coverage area or transmission range of the base station 404A. Therefore, the base station 404A may handover the group of UEs 408 to another base station 404B that would have the satellite 402 in its coverage area. The satellite 402 may switch the feeder link from base station 404A to base station 404B. The base station 404A and the base station 404B may be connected at 410 with each other via a core network, such as core network 190 or EPC 160 shown in FIG. 1. The base station 404A may transmit a handover request to the base station 404B and the base station 404B may acknowledge the handover request. The handover request may request to handover the group of UEs to the base station 404B. To signal the handover to the group of UEs 408, the base station 404A may transmit a group handover message 412 to the group of UEs 408. The group handover message 412 may be transmitted to the group of UEs 408 from the base station 404A via the satellite 402. The group of UEs 408 may establish a connection with the base station 404B via the satellite 402 based on the group handover message. Because the group of UEs 408 established connection with the base station 404B, the satellite 402 switched the feeder link from base station 404A to base station 404B.

Figure 5:
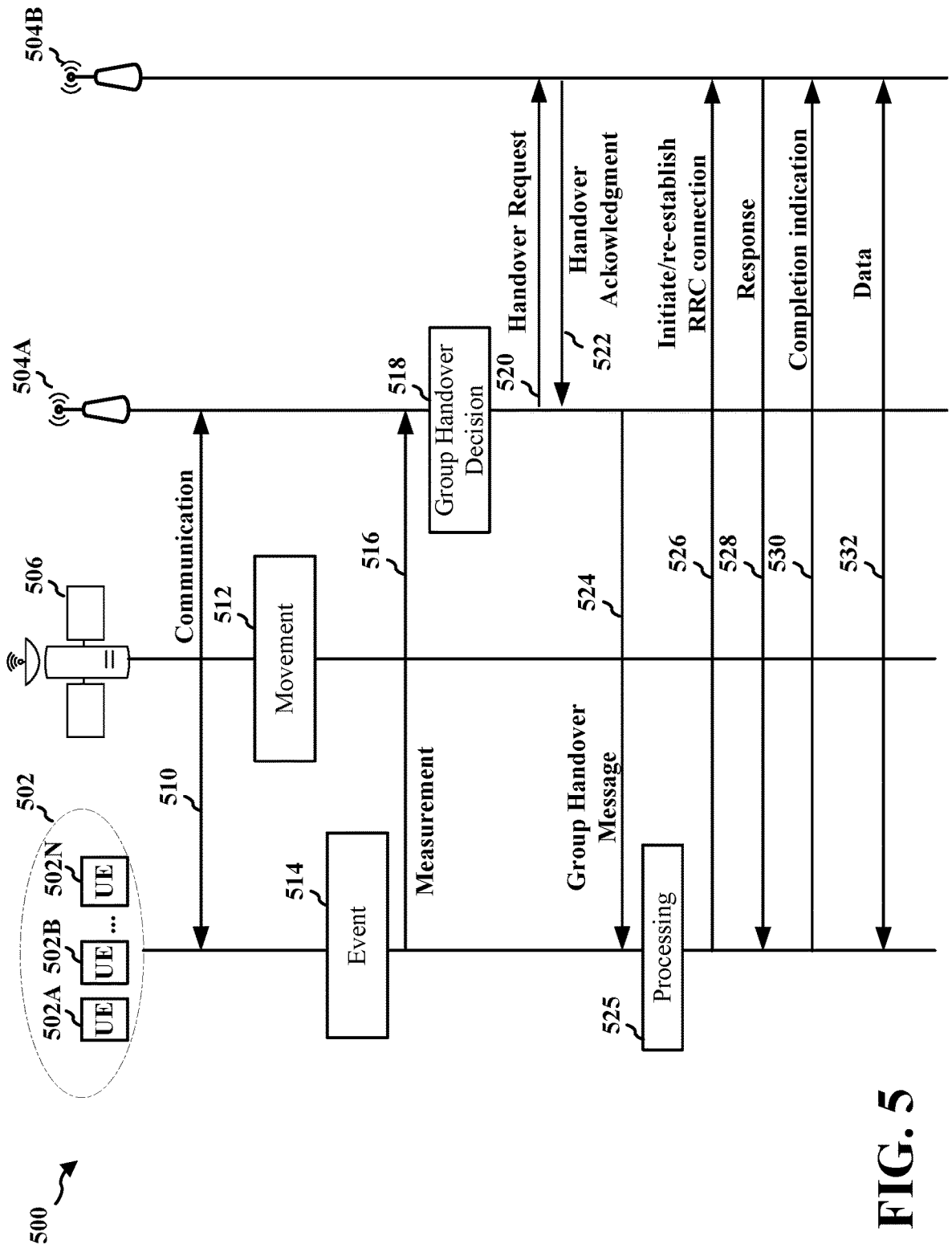
FIG. 5 is an example communication flow between a group of UEs and a base station that communicates via a satellite.

FIG. 5 is an example communication flow 500 between a group of UEs and a base station that communicates via a satellite. As illustrated in FIG. 5, a group of UEs 502 including one or more UEs 502A, 502B, and 502N are in communication 510 with a base station 504A via a satellite 506. The UEs 502A-502N may have an RRC connection with the base station 504A, for example. In some aspects, communication 510 between the base station 504A and the UEs in the group of UEs 502 may be exchanged via the satellite 506. The communication 510 may include data, control, etc. The communication 510 may include downlink communication and/or uplink communication.

The base station 504A may transmit a signal encoding data, such as user data or control data for any UE in the group of UEs 502, to the satellite 506. The satellite 506 may relay the data, such as by performing amplification, spatial filtering, or frequency conversion, to one or more UEs in the group of UEs 502. A UE in the group of UEs 502 may communicate with the base station 504A by transmitting a signal encoding data, such as user data of the UE, to the satellite 506. The satellite 506 may then relay the data, such as by performing amplification, spatial filtering, or frequency conversion, to the base station 504A. The communication link (i.e., radio link) between the base station 504A and the satellite 506 may be referred to as a feeder link A. In some aspects, the satellite 506 is a transparent satellite that is configured to perform amplification, spatial filtering, or frequency conversion. In some aspects, the satellite 506 is a regenerative satellite that may additionally perform other signal processing for relaying such as decoding, interference cancellation, signal regeneration but does not have the full functionality of a base station.

The satellite 506 may move (such as by orbiting around the Earth). As the satellite 506 moves at 512, the satellite may move out of a coverage area of the base station 504A. In some aspects, the UEs in the group of UE 502 may determine the occurrence of a trigger event 514 based on any of a variety of parameters such as 1) measurement events related to cell quality or propagation delay (e.g., when a measured quality is below a threshold or a delay is above a threshold), 2) location of the UEs and the satellite, 3) one or more timers that are configured in accordance with serve time and expected movement of the satellite, or 4) elevation angles of source and target cells. The UEs in the group of UEs 502 may report the occurrence of the event 516 (e.g., the measurement events) to the base station 504A. In some examples, the occurrence of the event may be determined at the base station, e.g., based on measurement information from one or more of the UEs in the group of UEs 502, one or more timers, a location of the satellite or the UEs, etc. The base station 504A may determine to initiate a group handover for the group of UEs 502. The base station 504A may determine, at 518, to initiate a group handover for the group of UEs 502. The determination may be based on any of a variety of triggering events. For example, the base station 504A may determine to initiate the group handover based on measurement-based triggering where cell quality for the group of UEs 502 has exceeded or fallen below a configured threshold. Alternatively or additionally, the base station 504A may determine to initiate the group handover based on locations of the group of UEs 502 and/or a location of the satellite 506. Alternatively or additionally, the base station 504A may determine to initiate the group handover based on additional triggering conditions based on timing advance value to the target cell. Alternatively or additionally, the base station 504A may determine to initiate the group handover based on elevation angles of source and target cells. The base station 504A may determine to initiate the group handover based on measurements from the group of UEs 502 or independent of the measurements performed by the group of UEs 502.

After the base station 504A determines, at 518, to handover the group of UEs 502, the base station 504A may transmit a handover request 520 to the base station 504B and receive a handover acknowledgment 522 from the base station 504B. Then the base station 504A may transmit one or more group handover messages 524 to the group of UEs 502. Each UE in the group of UEs processes the group handover message 524, as illustrated at 525, in order to determine that the UE is being handed over to a target base station.

In some aspects, as part of the handover acknowledgment 522 or the group hand over messages 524, the base station 504A may transmit an RRC reconfiguration with synchronization message in a PDSCH that includes group handover messages, or group handover commands, to the group of UEs 502. A cell specific common search space may be configured, and the group of UEs 502 may monitor the cell specific common search space to receive the PDSCH indicating the HO command for the group of UEs. The group handover command may include bits that are scrambled based on a cell specific group radio network temporary identifier (RNTI). Signaling radio bearer 1 (SRB1) information may provide a UE specific configuration, and UE specific integrity protection and ciphering of the RRC message may be applied for the SRB1 information for each individual UE in the group. An SRB-x, such as SRB 3 or SRB 4, may include group specific configuration information and may be protected with security information that is known to each of the UEs in the group. For example, access stratum (AS) security information may be transmitted to the group of UEs 502, and the signaling radio bearer information may be sent to the group of UEs with integrity protection and ciphering based on the AS security information for the group of UEs. A common group AS key may be provided to each UE in the group of UEs 502 upon joining of the group. In some aspects, the common group AS key may be derived using a set of cell specific or group specific parameters. For the group handover, the base station may transmit an RRC message that includes a list of RRC reconfiguration messages for multiple UEs. The RRC reconfiguration messages may include delta RRC configuration for each UE based on the particular UE's current configuration. A delta RRC configuration may refer to a configuration that includes parameters that are different than the UE's current configuration without including parameters that are the same as the UE's current configuration. In some aspects, one or more UE in the group of UEs 502 may not be provided with an RRC reconfiguration by the base station. The UE may interpret the absence of an RRC reconfiguration, or an RRC reconfiguration delta, as an indication to continue to use the UE's current RRC configuration with the target base station. In such aspects, a UE in the group of UEs 502 may continue to 526 to initiate an RRC connection with the target base station 504B using their respective current RRC configuration. The UEs in the group of UEs 502 may receive a response from the base station 504B at 528 and may transmit an RRC reconfiguration completion indication at 530. At 532, the UEs in the group of UEs 502 may transmit or receive user data with the target base station 504B. In some aspects, the communication (e.g., data 532) between the base station 504B and the UEs in the group of UEs 502 may be exchanged via the satellite 506.

In some aspects, the base station 504A may transmit the group handover message 524 comprising multiple RRC messages to the group of UEs 502. The multiple RRC messages may be multiplexed at medium access control (MAC) using one or more same or different logical channel identifiers (LCIDs). Each UE in the group of UEs 502 may attempt to decode all of the RRC messages in the multiplexed RRC messages (such as in SRB1). In some aspects, each UE may utilize a current SRB1 configuration and AS security profile for the particular UE to attempt to decode the multiple RRC messages. A UE in the group of UEs may decode a single RRC message from the multiplexed RRC messages based on the UE's AS security profile, e.g., one RRC message will pass the integrity protection check for the UE. In some aspects, each UE may use a default SRB1 configuration. After decoding the RRC messages, the UEs in the group of UEs 502 may initiate RRC reconfiguration with the target base station 504B. The UEs in the group of UEs 502 may receive a response 528 from the base station 504B and may transmit an RRC reconfiguration completion indication 530. After establishing the connection with the target base station, the UEs in the group of UEs 502 may transmit or receive user data 532 with the target base station 504B.

Each UE may be able to decode one RRC message intended for the UE and may fail to decode the other RRC messages that are not intended for the UE because the other RRC messages will fail an integrity protection check and may be subsequently discarded. Each RRC reconfiguration may include a delta configuration based on default UE configuration for the target. The delta configuration may refer to a configuration that includes parameters that are different than the default configuration without including parameters that are the same as the default configuration. The size of the group (e.g., the number of UEs in the group of UEs 502) may be configured by a network to fit the group handover message in a single transport block signal (TBS) size. For example, the number of UEs in the group of UEs may be based on an amount of group handover information that can be transmitted in one or more TBSs, e.g., in a single TBS.

In some aspects, the group handover message 524 may be transmitted in a broadcast or a groupcast message that is received by the group of UEs. In some aspects, the broadcast or groupcast message may be protected using common security keys for the group of UEs 502. The common security keys may be provided to the group of UEs 502 using dedicated RRC signaling. In some aspects, based on time and/or location, each UE in the group of UEs 502 may check the broadcast or groupcast message to determine if the group handover message 524 is provided for a target cell of the target base station 504B. In some aspects, the base station 504A may transmit (e.g., in communication 510) a group specific or UE specific indication to each UE in the group of UEs 502 to check the broadcast or groupcast message to schedule the time for the group handover message 524 to be transmitted as a broadcast message. In some aspects, the scheduling information may be provided to the group of UEs in the group handover message. In some aspects, the scheduling information may be provided to the group of UEs using an RRC reconfiguration upon a UE moving to RRC connected state or may be broadcast in system information, such as a SIB 1. In some aspects, each UE in the group of UEs 502 may acquires the broadcast or groupcast PDSCH before accessing the target cell at 526. The broadcast or groupcast message may be protected using common security keys for the group of UEs. The common security keys may be provided to the group of UEs in dedicated signaling for the group of UEs or to each UE in the group of UEs. If no group handover message is configured or received, each UE in the group of UEs 502 can initiate RRC re-establishment procedure at 526, such as based on preconfigured time/location. The UEs in the group of UEs 502 may receive a response 528 from the base station 504B and may transmit an RRC reconfiguration completion indication 530. Then, the UEs in the group of UEs 502 may transmit or receive user data 532 with the target base station 504B.

The RRC reconfigurations may include delta configurations. The delta configuration may be based on each UE's source configuration or current configuration. The delta configuration may indicate parameters of the configuration that are different than the UE's source configuration or a default configuration without indicating parameters that will remain unchanged. In some aspects, the delta configuration for each UE in the group of UEs 502 may be based on a default UE configuration for the target base station 504B. The default UE configuration for the target base station 504B may be a full configuration of parameters for communication with the target base station. In some aspects, the default UE configuration for the target base station 504B may be provided before the handover decision at 518. In some aspects, the group handover message may provide common target configuration for each UE in the group of UEs. A list of RRC reconfigurations may include delta configuration that individually indicate one or more parameters that will be changed for each UE.

In some aspects, the group handover message may include an indication to continue to use a current source cell configuration. In some aspects, the target base station 504B may accept the same UE radio configuration that was used in the source base station 504A. The cell specific/carrier specific configuration for the UEs may be the same. Security keys may be different between the source base station and the target base station, and the UEs may receive a next hop chaining counter (NCC) and/or a cell radio network temporary identifier (C-RNTI) for the target base station in the group handover message.

A new feeder link to a new base station may lead to a different time delay for communication. In some aspects, the group handover message may include a new round trip delay (RTD) value between satellite and gateway (i.e., the target base station 504B). The new RTD value may be used by each UE in the group of UEs 502 for uplink pre-compensation, such as in uplink transmissions in 526, 530, and 532. The new RTD value may be included in a system information block (SIB).

In some aspects, if timing advance (TA) would be different for the target base station 504B compared with the base station 504A, the base station 504A may provide adjustment to TA using UE specific or group specific indication (e.g., DCI using group RNTI) to adjust the feeder link propagation delay which is common to each UE in the group of UEs in the group of UEs 502. The pre-compensation applied to the UE to satellite link may remain the same. The UEs in the group of UEs 502 may use the same TA for the target base station 504B without receiving an indication of TA adjustment. In some aspects, the UEs in the group of UEs 502 may read system information to receive the latest common configuration that may include paging, random access and initial pre-compensation TA values for initial access before initiating the RRC access with base station 504B at 526. In such aspects, the group handover message may not include common configuration or system information to reduce the size of the handover message and the UEs in the group of UEs 502 may initiate the RRC access with base station 504B at 526 based on pre-configured execution condition, such as time, location, or the like.

In some aspects, SIB in the cell is considered not changed after the feeder link changes from base station 504A to base station 504B. The information regarding SIB may be transparent to UEs in IDLE mode or RRC_INACTIVE mode. For such UEs, changes in RTD may not trigger SI updating procedure.

Figure 6:
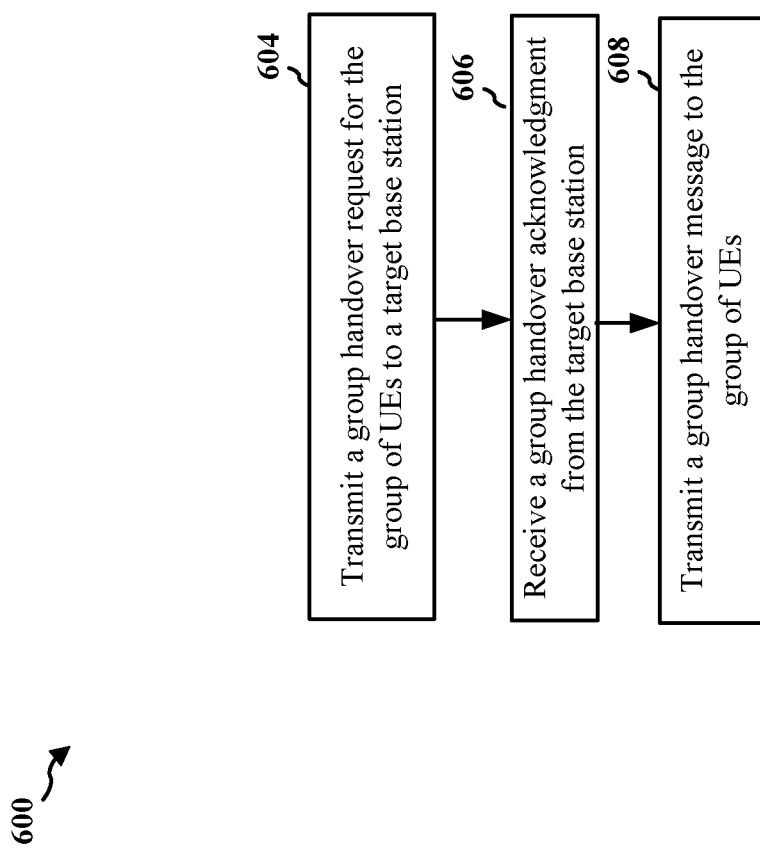
FIG. 6 is a flowchart of a method of wireless communication of a base station.

FIG. 6 is a flowchart 600 of a method of wireless communication. The method may be performed by a base station (e.g., the base station 102/180; the base station 310; the base station 504A, the base station 404A, the apparatus 802). The method helps to provide a more efficient handover of a group of UEs and to reduce signaling overhead to hand each of the UEs over to a target base station.

At 604, the base station transmits a group handover request for the group of UEs to a target base station. For example, the base station 504A may transmit handover request 520 to the target base station 504B. For example, transmission 604 may be performed by group handover request component 842. Transmission 604 may include aspects described in conjunction with handover request 520 of FIG. 5. In some aspects, the base station transmits the group handover request to check with the target base station regarding whether the target base station has the resources to process the handover.

At 606, the base station receives a group handover acknowledgment from the target base station. For example, the base station 504A may receive handover acknowledgment 522 from the base station 504B. For example, reception 606 may be performed by reception component 830. Reception 606 may include aspects described in conjunction with handover acknowledgment 522 of FIG. 5. In some aspects, the target base station may transmit the handover acknowledgment to indicate that the target base station can be used as target for handover.

At 608, the base station transmits a group handover message to the group of UEs. For example, transmission 608 may be performed by transmission component 834. For example, the base station 504A may transmit a group handover message 524 to the group of UEs 502. In some aspects, the group handover message is transmitted to each UE in the group of UEs in an RRC reconfiguration with synchronization. In some aspects, the group handover message is transmitted to the group of UEs based on a cell specific common search space. In some aspects, at least a portion of the group handover message is scrambled with a cell specific group RNTI. In some aspects, the RRC reconfiguration comprises an RRC message comprising a list of RRC reconfiguration messages for each UE in the group of UEs. In some aspects, an RRC reconfiguration message in the list of RRC reconfiguration messages indicates a difference with respect to a current configuration for a respective UE.

Figure 7:
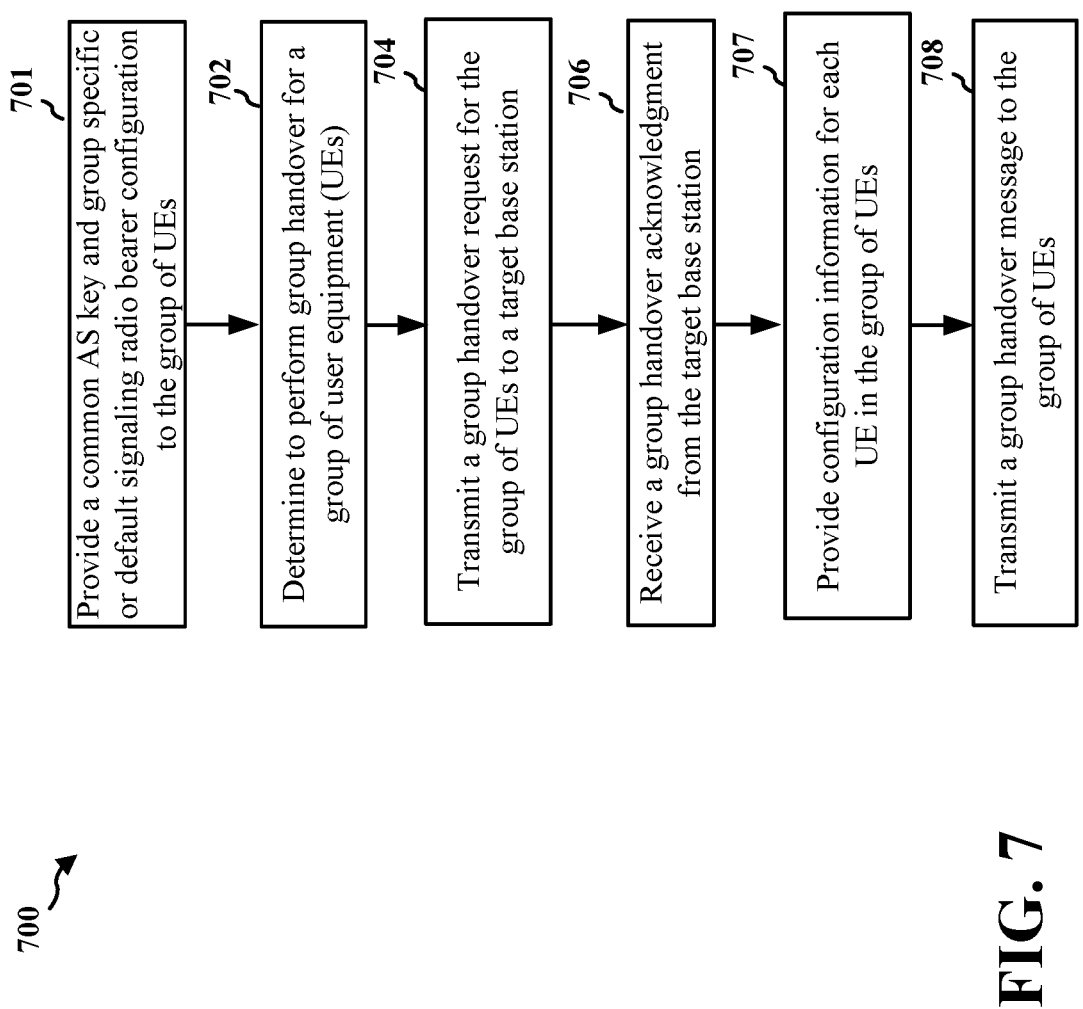
FIG. 7 is a flowchart of a method of wireless communication of a UE.

FIG. 7 is a flowchart 700 of a method of wireless communication. The method may be performed by a base station (e.g., the base station 102/180; the base station 310; the base station 504A, the base station 404A, the apparatus 802). The method helps to provide a more efficient handover of a group of UEs and to reduce signaling overhead to hand each of the UEs over to a target base station.

In some aspects, at 701, the base station provides a common AS key and group specific or default signaling radio bearer configuration to a group of UEs. For example, the base station 504A may provide common AS key and group specific or default signaling radio bearer configuration to a group of UEs. In some aspects, the base station sends new SRB information to the group of UEs with integrity protection and ciphering based on the common AS key and group specific new SRB configuration. In some aspects, provision 701 may be performed by AS Key and configuration component 848.

At 702, the base station determines to perform a group handover for the group of UEs. For example, determination 702 may be performed by determination component 840. For example, the base station 504A may determine to perform a group handover at 518. In some aspects, the base station communicates with the group of UEs via a transparent satellite, such as the satellite 506/402. The base station may determine to perform a group handover for the group of UEs based on a variety of triggers that may be triggered due to movement of satellite. For example, the base station may determine to perform the group handover based on measurement-based triggering where cell quality for the group of UEs has varied passed a preconfigured threshold. Alternatively or additionally, the base station may determine to perform the group handover based on location of the group of UEs and the satellite. Alternatively or additionally, the base station may determine to perform the group handover based on additional triggering conditions based on timing advance value to the target cell. Alternatively or additionally, the base station may determine to perform the group handover based on elevation angles of source and target cells. The base station 504A may determine to perform the group handover based on or independent of the measurements performed by the group of UEs.

At 704, the base station transmits a group handover request for the group of UEs to a target base station. For example, the base station 504A may transmit handover request 520 to the target base station 504B. For example, transmission 704 may be performed by group handover request component 842. Transmission 704 may include aspects described in conjunction with handover request 520 of FIG. 5. In some aspects, the base station transmits the group handover request to check with the target base station regarding whether the target base station has the resources to process the handover.

At 706, the base station receives a group handover acknowledgment from the target base station. For example, the base station 504A may receive handover acknowledgment 522 from the base station 504B. For example, reception 706 may be performed by reception component 830. Reception 706 may include aspects described in conjunction with handover acknowledgment 522 of FIG. 5. In some aspects, the target base station may transmit the handover acknowledgment to indicate that the target base station can be used as target for handover.

In some aspects, at 707, the base station provides configuration information for each UE in the group of UEs. For example, the base station 504A may provide configuration information for each UE in the group of UEs 502. For example, provision 707 may be performed by AS Key and configuration component 848. The configuration information for each UE in the group of UEs may indicate a change in one or more configuration parameters for the UE relative to a common configuration for the target base station. In some aspects, the common configuration includes a default configuration for the target base station applicable to all UEs (each UE in the group of UEs) or a full configuration for the target base station. In some aspects, the configuration information is provided to the group of UEs in the group handover message or in a downlink message prior to the handover decision. In some aspects, provision 707 may be part of transmission 708 or may occur prior to determination 702.

At 708, the base station transmits a group handover message to the group of UEs. For example, transmission 708 may be performed by transmission component 834. For example, the base station 504A may transmit a group handover message 524 to the group of UEs 502. In some aspects, the group handover message is transmitted to each UE in the group of UEs in an RRC reconfiguration with synchronization. In some aspects, the group handover message is transmitted to the group of UEs based on a cell specific common search space. In some aspects, at least a portion of the group handover message is scrambled with a cell specific group RNTI. In some aspects, the RRC reconfiguration comprises an RRC message comprising a list of RRC reconfiguration messages for each UE in the group of UEs. In some aspects, an RRC reconfiguration message in the list of RRC reconfiguration messages indicates a difference with respect to a current configuration for a respective UE.

In some aspects, the group handover message comprises a MAC message comprising multiplexed radio resource control RRC messages using one or more logical channel identifiers LCIDs. In some aspects, each RRC message in the multiplexed RRC messages is based on a SRB configuration and AS key for a UE in the group of UEs. In some aspects, the SRB configuration is specific to the UE or comprises a default radio bearer configuration. In some aspects, each RRC message in the multiplexed RRC messages includes a delta configuration based on default UE configuration for the target base station. In some aspects, a size of the group of UEs is based on an amount of the multiplexed RRC messages allowed in a single TBS.

In some aspects, the group handover message is transmitted in a groupcast message. The groupcast message may be transmitted at a specified or pre-defined time or location for the group of UEs. The base station may transmit an indication to one or more UEs of the group of UEs when to check the groupcast message. In some aspects, the groupcast message comprises scheduling information. In some aspects, the groupcast message is encrypted using a group common security key for the group of UEs.

In some aspects, the handover message comprises an indication to continue to use a current source cell configuration with the target base station. The handover message may comprise a new security key for communication with the target base station. In some aspects, the handover message comprises an NCC and a C-RNTI for the target base station. In some aspects, the handover message comprises a new RTD value for the target base station. In some aspects, the handover message comprises a new TA for the target base station.

Figure 8:
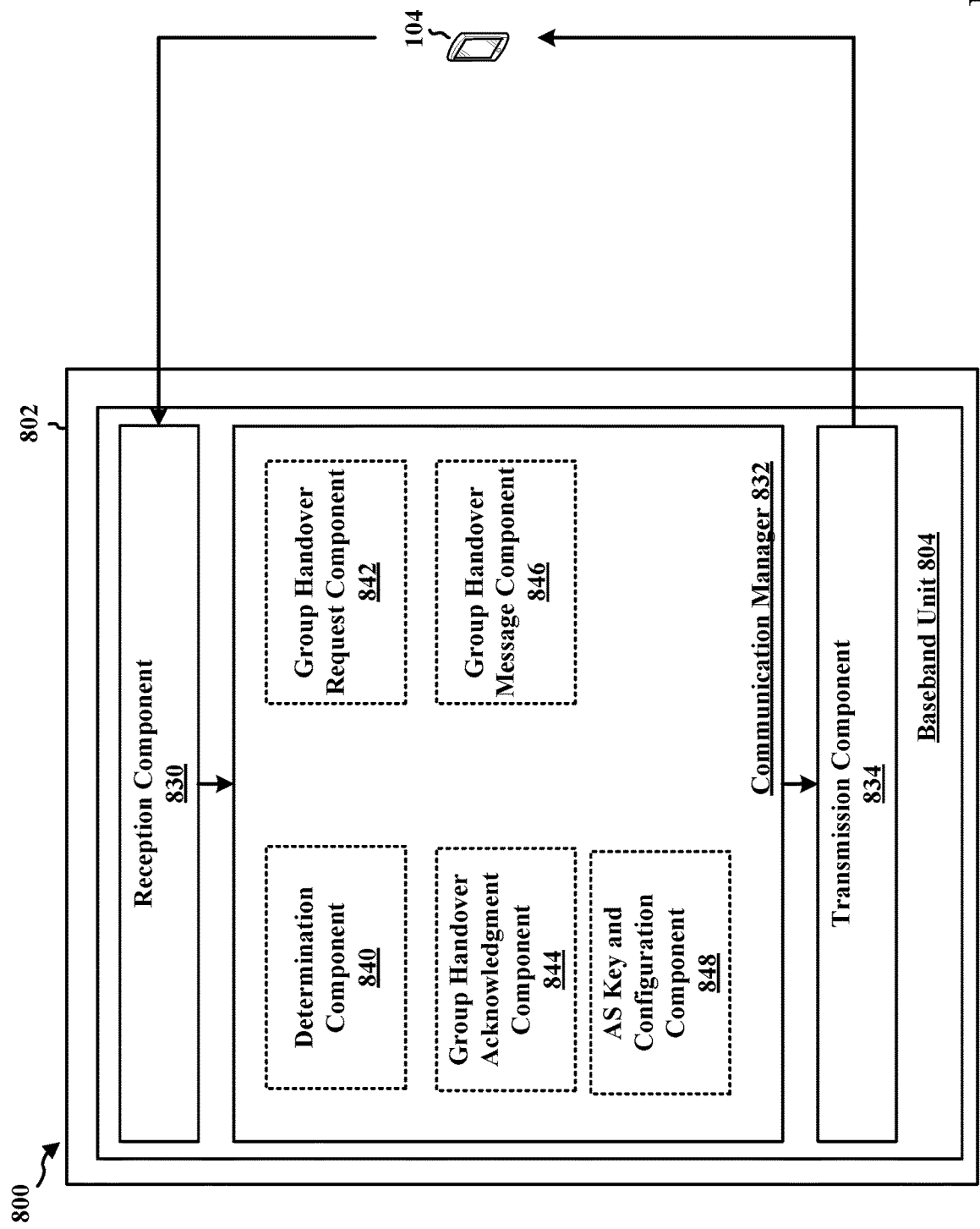
FIG. 8 is a diagram illustrating an example of a hardware implementation for an example apparatus.

FIG. 8 is a diagram 800 illustrating an example of a hardware implementation for an apparatus 802. The apparatus 802 is a BS and includes a baseband unit 804. The baseband unit 804 may communicate through a cellular RF transceiver with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the BS 310 and may include the memory 376 and/or at least one of the TX processor 316, the RX processor 370, and the controller/processor 375.

The communication manager 832 includes a determination component 840 that is configured to determine to perform group handover for a group of UEs, e.g., as described in connection with determination 702 of FIG. 7.

The communication manager 832 includes a group handover request component 842 that transmits a group handover request for the group of UEs to a target base station, e.g., as described in connection with transmission 604 of FIG. 6 and transmission 704 of FIG. 7.

The communication manager 832 includes a group handover acknowledgment component 844 that receives a group handover acknowledgment from the target base station, e.g., as described in connection with reception 606 of FIG. 6 and reception 706 of FIG. 6.

The communication manager 832 includes a group handover message component 846 that transmits a group handover message to the group of UEs, e.g., as described in connection with transmission 608 of FIG. 6 and transmission 708 of FIG. 7.

The communication manager 832 includes a AS Key and configuration component 848 that provides configuration information for each UE in the group of UEs and provides a common AS key and group specific or default signaling radio bearer configuration to the group of UEs, e.g., as described in connection with provisions 701 and 707 of FIG. 7.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for determining to perform group handover for a group of UEs. The baseband unit 804 may further include means for transmitting a group handover request for the group of UEs to a target base station. The baseband unit 804 may further include means for receiving a group handover acknowledgment from the target base station. The baseband unit 804 may further include means for transmitting a group handover message to the group of UEs. The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
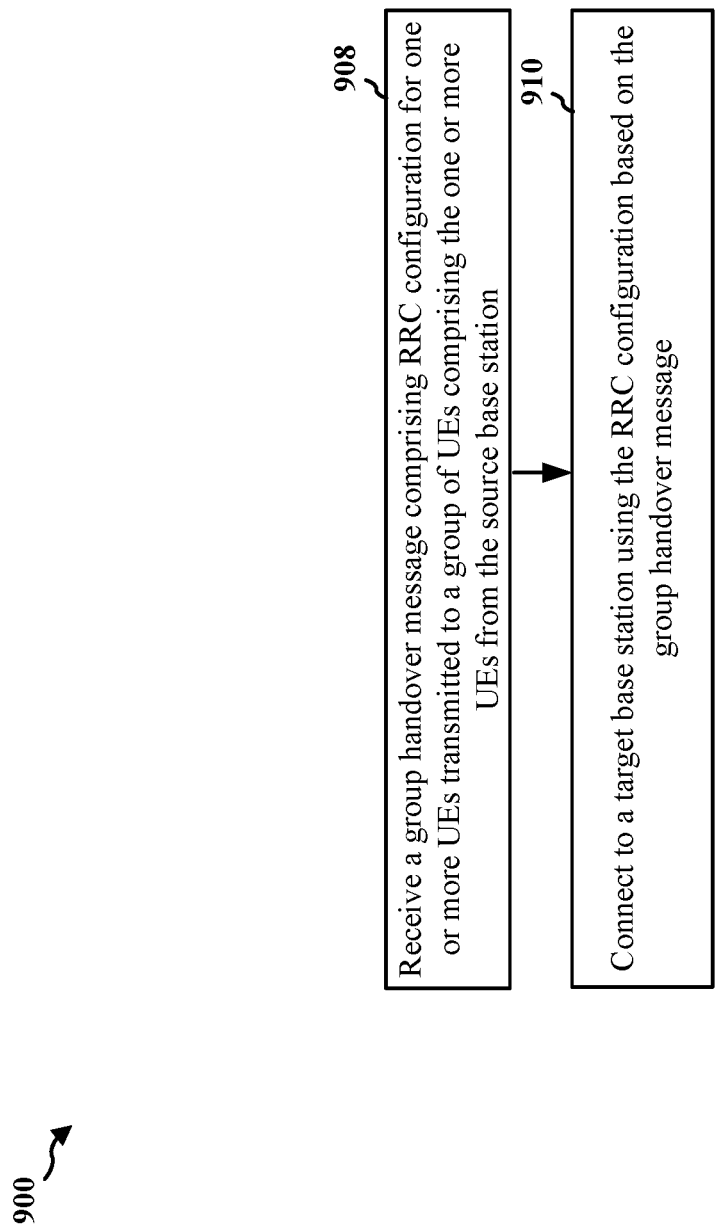
FIG. 9 is a flowchart of a method of wireless communication of a UE.

FIG. 9 is a flowchart 900 of a method of wireless communication. The method may be performed by a UE (e.g., the UE 94; a UE in the group of UEs 408; a UE in the group of UEs 502; the apparatus 802) served by a source base station. In some aspects, a size of the group of UEs is based on an amount of RRC messages allowed in a single TBS. The method helps to provide a more efficient handover of a group of UEs and to reduce signaling overhead to hand each of the UEs over to a target base station.

At 908, the UE may receive a group handover message comprising RRC configuration for one or more UEs transmitted to a group of UEs comprising the one or more UEs from the source base station. For example, a UE in the UEs 502 may receive the group handover message 524 from the base station 504A. For example, reception 908 may be performed by group handover message reception component 1140. In some aspects, the source base station communicates with the group of UEs via a satellite. In some aspects, the group handover message is received in an RRC reconfiguration with synchronization for the group of UEs. In some aspects, the UE receives the group handover message in a cell specific common search space. In some aspects, at least a portion of the group handover message is scrambled with a cell specific group RNTI.

At 910, the UE connects to a target base station using the RRC configuration based on the group handover message. For example, a UE in the UEs 502 may establish connection with the base station 504B based on the group handover message. For example, connection 910 may be performed by group handover connection component 1142. To connect to the target base station, in some aspects, the UE decodes one RRC message in the multiplexed RRC messages that is directed to the UE.

Figure 10:
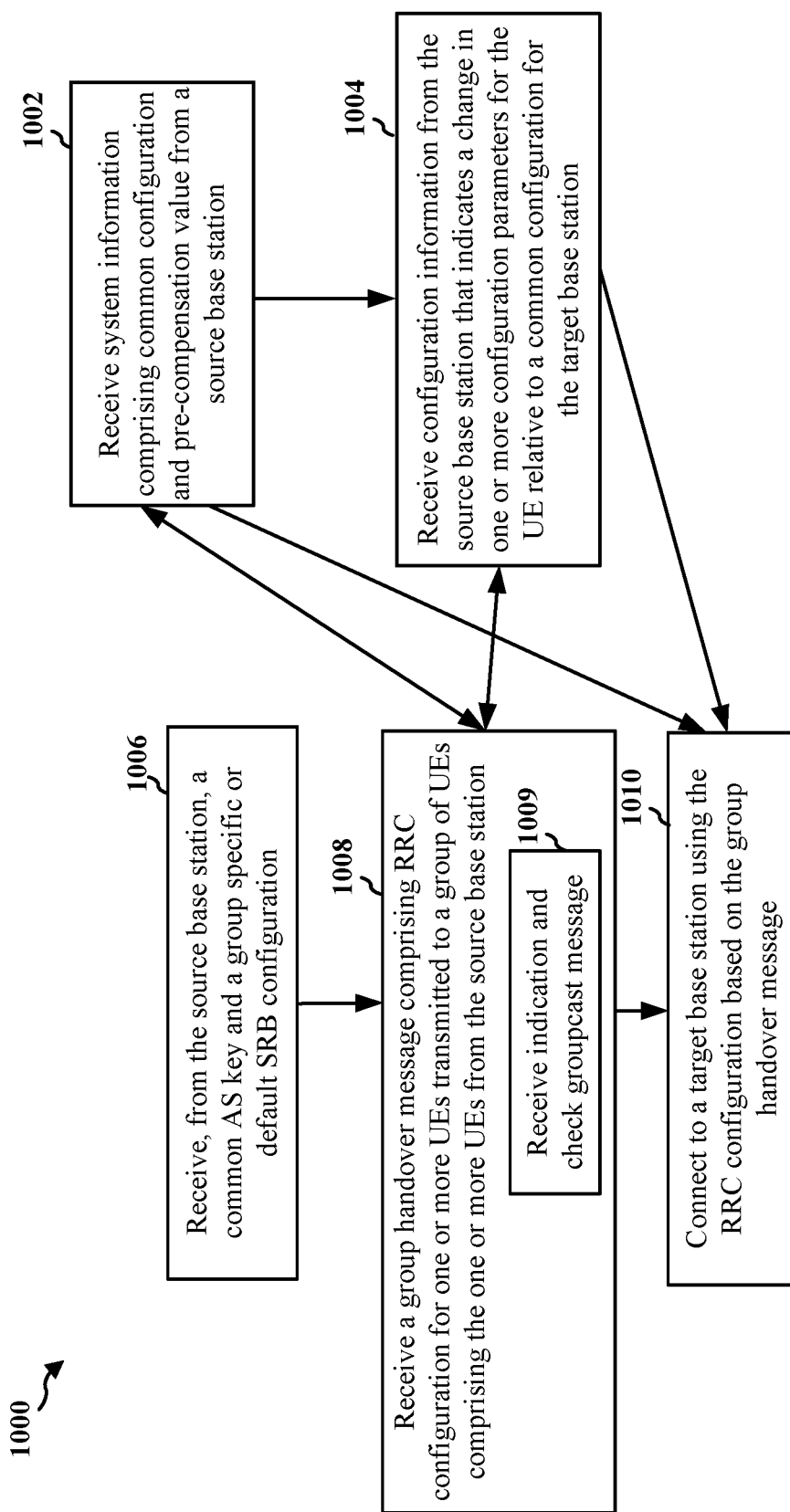
FIG. 10 is a flowchart of a method of wireless communication of a UE.

FIG. 10 is a flowchart 1000 of a method of wireless communication. The method may be performed by a UE (e.g., the UE 104; a UE in the group of UEs 408; a UE in the group of UEs 502; the apparatus 802) served by a source base station. In some aspects, a size of the group of UEs is based on an amount of RRC messages allowed in a single TBS. The method helps to provide a more efficient handover of a group of UEs and to reduce signaling overhead to hand each of the UEs over to a target base station.

At 1006, the UE receives, from the source base station, a common AS key and a group specific or default SRB configuration that is common to the group of UEs. For example, a UE in the UEs 502 may receive a common AS key and a group specific or default SRB configuration from the base station 504A. For example, reception 1006 may be performed by AS key component 1148. In some aspects, new SRB information in the group handover message includes integrity protection and cyphering based on the common AS key and group specific new SRB configuration.

At 1008, the UE receives a group handover message comprising RRC configuration for one or more UEs transmitted to a group of UEs comprising the one or more UEs from the source base station. For example, a UE in the UEs 502 may receive the group handover message 524 from the base station 504A. For example, reception 1008 may be performed by group handover message reception component 1140. In some aspects, the source base station communicates with the group of UEs via a satellite. In some aspects, the group handover message is received in an RRC reconfiguration with synchronization for the group of UEs. In some aspects, the UE receives the group handover message in a cell specific common search space. In some aspects, at least a portion of the group handover message is scrambled with a cell specific group RNTI.

In some aspects, the RRC reconfiguration comprises an RRC message comprising a list of RRC reconfiguration messages for each UE in the group of UEs. In some aspects, an RRC reconfiguration message in the list of RRC reconfiguration messages that is for the UE indicates one or more different parameters with respect to a current configuration for the UE. In some aspects, the group handover message comprises a MAC message including multiplexed RRC messages using one or more LCIDs.

In some aspects, the UE receives the group handover message in a groupcast message. As part of 1008, at 1009, the UE may check the groupcast message for the group handover message based on a specified or pre-defined time or a location and may receive an indication from the source base station about the groupcast message. The UE may receive the group handover message in the groupcast message in response to receiving the indication. The indication may be specific to the UE or may be for the group of UEs. In some aspects, UE acquires the groupcast message in a PDSCH before accessing a target cell of a target base station.

In some aspects, the groupcast message comprises scheduling information. In some aspects, the groupcast message is encrypted using a group common security key provided for the group of UEs. In some aspects, the group handover message comprises an indication to continue to use a current source cell configuration with the target base station. In some aspects, the group handover message comprises a new security key for communication with the target base station. In some aspects, the group handover message comprises an NCC and a C-RNTI for the target base station. In some aspects, the group handover message comprises a new RTD value. In some aspects, the group handover message comprises a new TA.

In some aspects, system information comprising common configuration and pre-compensation value for the target base station may be included in the group handover message. In some aspects, system information comprising common configuration and pre-compensation value for the target base station are not included in the group handover message. In such aspects, the UE may receive system information comprising common configuration and pre-compensation value for the target base station at 1002 before connecting to the target base station. In some aspects, the common configuration for the target base station comprises a default configuration for the target base station applicable to each UE in the group of UEs or full configuration for the target base station. In some aspects, the configuration information is received in the group handover message or in a downlink message prior to the handover decision. In some aspects, at 1004, the UE may receive configuration information from the source base station that indicates a change in one or more configuration parameters for the UE relative to a common configuration for the target base station.

At 1010, the UE connects to a target base station using the RRC configuration based on the group handover message. For example, a UE in the UEs 502 may establish connection with the base station 504B based on the group handover message. For example, connection 1010 may be performed by group handover connection component 1142. To connect to the target base station, in some aspects, the UE decodes one RRC message in the multiplexed RRC messages that is directed to the UE. In some aspects, the UE uses a current UE specific SRB 1 and AS security key/profile received at reception 1006 to attempt to decode the multiplexed RRC messages to determine the RRC message intended for it. In some aspects, the UE uses a default SRB1, such as a SRB1 received at reception 1002 or 1006 to attempt to decode the multiplexed messages. In some aspects, the UE may be able to decode the RRC message intended for the UE and may fail to decode the other RRC messages.

In some aspects, one RRC message that is directed to the UE from the multiplexed RRC messages includes a delta configuration based on default UE configuration for the target base station.

In some aspects, the group handover message is transmitted in a synchronization message transmitted to each UE in the group of UEs in an RRC reconfiguration.

In some aspects, each UE in the group of UEs is configured with a cell specific group RNTI. In some aspects, the RRC reconfiguration comprises an RRC message comprising a list of RRC reconfiguration messages for each UE in the group of UEs. In some aspects, each UE in the group of UEs receives a common AS key and a group specific configuration. In some aspects, each UE in the group of UEs is configured with a UE specific SRB1.

In some aspects, the group handover message is transmitted in multiple RRC messages multiplexed at MAC using one or more LCIDs or cell radio network temporary identifiers (C-RNTIs) MAC control elements.

Figure 11:
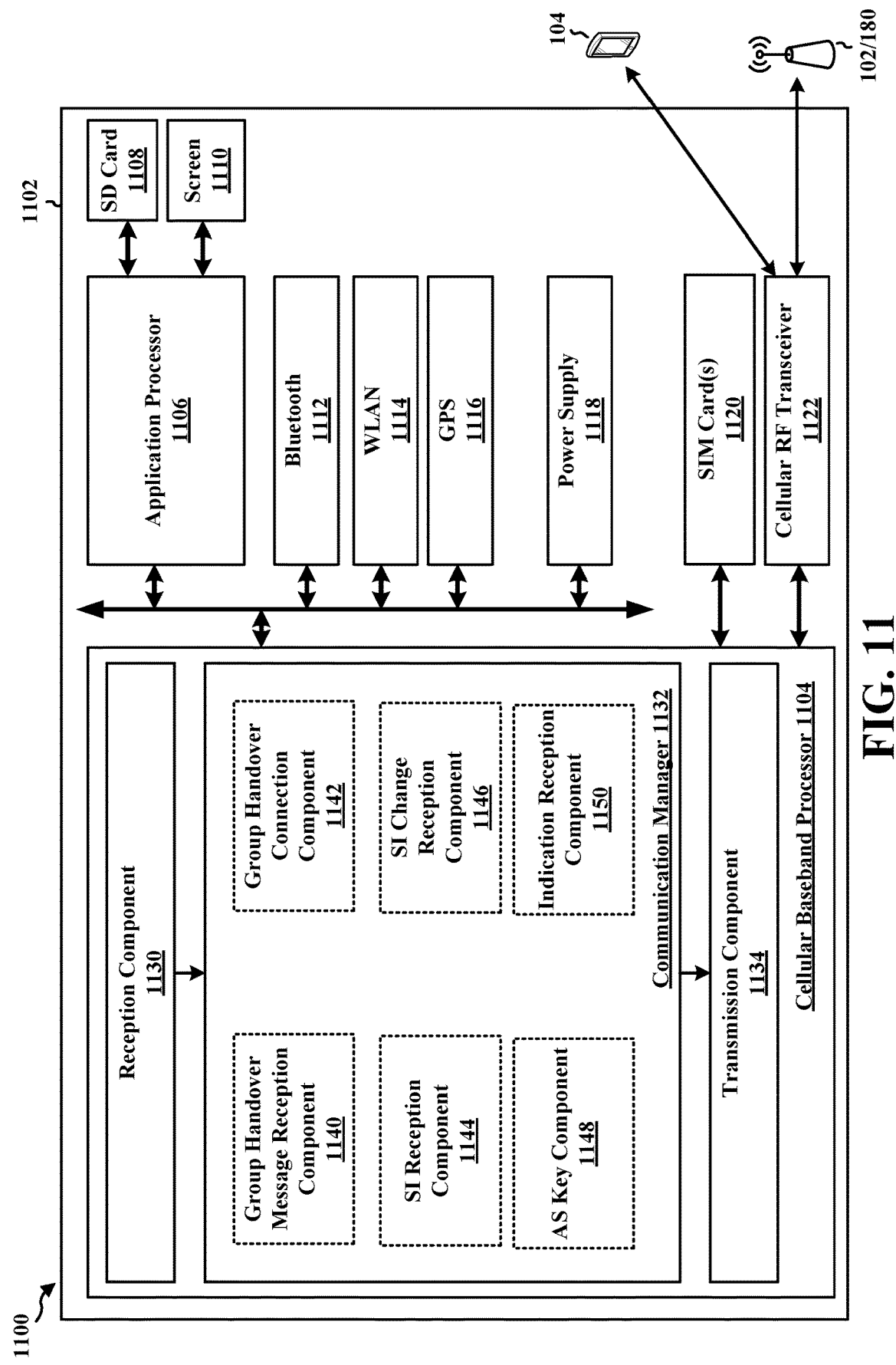
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a group handover message reception component 1140 that is configured to receive a group handover message comprising RRC configuration for one or more UEs transmitted to a group of UEs comprising the one or more UEs from the source base station, e.g., as described in connection with 908 in FIGS. 9 and 1008 in FIG. 10.

The communication manager 1132 further includes a group handover connection component 1142 that is configured to connect to a target base station using the RRC configuration based on the group handover message, e.g., as described in connection with 910 in FIGS. 9 and 1010 in FIG. 10.

The communication manager 1132 may further include a SI reception component 1144 that is configured to receive system information comprising common configuration and pre-compensation value from a source base station, e.g., as described in connection with 1002 in FIG. 10.

The communication manager 1132 may further include a SI change reception component 1146 that is configured to receive configuration information from the source base station that indicates a change in one or more configuration parameters for the UE relative to a common configuration for the target base station, e.g., as described in connection with 1004 in FIG. 10.

The communication manager 1132 may further include an AS key component 1148 that is configured to receive a common AS key and a group specific or default SRB configuration from the source base station, e.g., as described in connection with 1006 of FIG. 10.

The communication manager 1132 may further include an indication reception component 1150 that is configured to check a groupcast message for the group handover message based on a specified or pre-defined time or a location and receive an indication from the source base station about the groupcast message, e.g., as described in connection with 1009 of FIG. 10.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving a group handover message transmitted to a group of UEs from a source base station and means for connecting to a target base station based on the group handover message. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is an apparatus for wireless communication of a base station, comprising: a memory; and at least one processor coupled to the memory and configured to: transmit a group handover request for a group of UEs to a target base station; receive a group handover acknowledgment from the target base station; and transmit a group handover message to the group of UEs.

Aspect 2 is the apparatus of aspect 1, wherein the base station communicates with the group of UEs via a satellite, and wherein the group handover message is transmitted to each UE in the group of UEs in a RRC reconfiguration with synchronization.

Aspect 3 is the apparatus of any of aspects 1-2, wherein the group handover message is transmitted to the group of UEs based on a cell specific common search space, and wherein at least a portion of the group handover message is scrambled with a cell specific group RNTI.

Aspect 4 is the apparatus of any of aspects 1-3, wherein the at least one processor coupled to the memory is further configured to: provide a common AS key and group specific or default signaling radio bearer configuration to the group of UEs; wherein the base station sends new SRB information to the group of UEs with integrity protection and ciphering based on the common AS key and a group specific new SRB configuration.

Aspect 5 is the apparatus of any of aspects 1-4, wherein the group handover message comprises an RRC message comprising a list of RRC reconfiguration messages for each UE in the group of UEs, and wherein an RRC reconfiguration message in the list of RRC reconfiguration messages indicates a difference with respect to a current configuration for a respective UE.

Aspect 6 is the apparatus of any of aspects 1-5, wherein the group handover message comprises MAC messages multiplexing RRC messages using one or more LCIDs or C-RNTIs MAC control elements.

Aspect 7 is the apparatus of any of aspects 1-6, wherein each RRC message in the multiplexed RRC messages is based on a SRB and AS key of a UE in the group of UEs, and wherein the SRB configuration is specific to the UE or comprises a default radio bearer configuration.

Aspect 8 is the apparatus of any of aspects 1-7, wherein each RRC message in the multiplexed RRC messages includes a delta configuration based on default UE configuration for the target base station.

Aspect 9 is the apparatus of any of aspects 1-8, wherein a size of the group of UEs is based on an amount of the multiplexed RRC messages allowed in a single TBS.

Aspect 10 is the apparatus of any of aspects 1-9, wherein the group handover message is transmitted in a groupcast message, and wherein the groupcast message is transmitted at a specified or pre-defined time or location for the group of UEs.

Aspect 11 is the apparatus of any of aspects 1-10, wherein the at least one processor coupled to the memory is further configured to: transmit an indication to one or more UEs of the group of UEs when to check the groupcast message.

Aspect 12 is the apparatus of any of aspects 1-11, wherein the groupcast message is encrypted using a group common security key for the group of UEs.

Aspect 13 is the apparatus of any of aspects 1-12, wherein the at least one processor coupled to the memory is further configured to: provide configuration information for each UE in the group of UEs, wherein the configuration information for a UE in the group of UEs indicates a change in one or more configuration parameters for the UE relative to a common configuration for the target base station, wherein the common configuration for the target base station comprises a default configuration for the target base station applicable to each UE in the group of UEs or a full configuration for the target base station, wherein the configuration information is provided to the group of UEs in the group handover message or in a downlink message prior to a handover decision.

Aspect 14 is the apparatus of any of aspects 1-13, wherein the group handover message one or more of: an indication to continue to use a current source cell configuration with the target base station, a new security key for communication with the target base station, a NCC and a C-RNTI for the target base station, a new RTD value for the target base station, or a new TA for the target base station.

Aspect 15 is an apparatus for wireless communication at a UE served by a source base station, comprising: a memory; and at least one processor coupled to the memory and configured to: receive a group handover message comprising RRC configuration for one or more UEs transmitted to a group of UEs comprising the one or more UEs from the source base station; and connect to a target base station using the RRC configuration based on the group handover message.

Aspect 16 is the apparatus of aspect 15, wherein the source base station communicates with the group of UEs via a satellite.

Aspect 17 is the apparatus of any of aspects 15-16, wherein the group handover message is received in a RRC reconfiguration with synchronization for the group of UEs, wherein the UE receives the group handover message in a cell specific common search space, and wherein at least a portion of the group handover message is scrambled with a cell specific group RNTI.

Aspect 18 is the apparatus of any of aspects 15-17, wherein the at least one processor coupled to the memory is further configured to: receive, from the source base station, a common AS key and a group specific or default SRB configuration that is common to the group of UEs.

Aspect 19 is the apparatus of any of aspects 15-18, wherein new SRB information in the group handover message includes integrity protection and cyphering based on the common AS key and a group specific new SRB configuration.

Aspect 20 is the apparatus of any of aspects 15-19, wherein the RRC reconfiguration comprises an RRC message comprising a list of RRC reconfiguration messages for each UE in the group of UEs, and wherein an RRC reconfiguration message in the list of RRC reconfiguration messages that is for the UE indicates one or more different parameters with respect to a current configuration for the UE.

Aspect 21 is the apparatus of any of aspects 15-20, wherein the group handover message comprises a MAC message multiplexing RRC messages using one or more LCIDs or C-RNTIs MAC control elements.

Aspect 22 is the apparatus of any of aspects 15-21, wherein the UE decodes one RRC message in the multiplexed RRC messages that is directed to the UE.

Aspect 23 is the apparatus of any of aspects 15-22, wherein the UE uses a current UE specific SRB1 and AS security profile to attempt to decode the multiplexed RRC messages to determine an RRC message intended for the UE.

Aspect 24 is the apparatus of any of aspects 15-22, wherein the UE uses a default SRB1 to attempt to decode the multiplexed RRC messages.

Aspect 25 is the apparatus of any of aspects 15-25, wherein the one RRC message that is directed to the UE from the multiplexed RRC messages includes a delta configuration based on default UE configuration for the target base station.

Aspect 26 is the apparatus of any of aspects 15-25, wherein the UE receives the group handover message in a groupcast message.

Aspect 27 is the apparatus of any of aspects 15-26, wherein the at least one processor coupled to the memory is further configured to: check the groupcast message for the group handover message based on a specified or pre-defined time or a location.

Aspect 28 is the apparatus of any of aspects 15-26, wherein the at least one processor coupled to the memory is further configured to: receive an indication from the source base station about the groupcast message, wherein the UE receives the group handover message in the groupcast message in response to receiving the indication.

Aspect 29 is the apparatus of any of aspects 15-28, wherein the group handover message comprises an indication to continue to use a current source cell configuration with the target base station, and wherein the at least one processor coupled to the memory is further configured to: receive system information comprising common configuration and pre-compensation value for the target base station before connecting to the target base station if information is not provided in handover message.

Aspect 30 is the apparatus of any of aspects 15-29, further comprising a transceiver.

What is claimed is:

1. An apparatus for wireless communication of a base station, comprising:
   memory; and
   at least one processor coupled to the memory and configured to:
      transmit a group handover request for a group of user equipment (UEs) to a target base station;
      receive a group handover acknowledgment from the target base station; and
      transmit a group handover message to the group of UEs based on a cell specific common search space, and wherein at least a portion of the group handover message is scrambled with a cell specific group radio network temporary identifier (RNTI).

2. The apparatus of claim 1, wherein the base station communicates with the group of UEs via a satellite, and wherein the group handover message is transmitted to each UE in the group of UEs in a radio resource control (RRC) reconfiguration with synchronization.

3. The apparatus of claim 1, wherein the at least one processor coupled to the memory is further configured to:
   provide a common access stratum (AS) key and group specific or default signaling radio bearer configuration to the group of UEs;
   wherein the base station sends new signaling radio bearer (SRB) information to the group of UEs with integrity protection and ciphering based on the common AS key and a group specific new SRB configuration.

4. The apparatus of claim 1, wherein the group handover message comprises an RRC message comprising a list of RRC reconfiguration messages for each UE in the group of UEs, and wherein an RRC reconfiguration message in the list of RRC reconfiguration messages indicates a difference with respect to a current configuration for a respective UE.

5. The apparatus of claim 1, wherein the group handover message comprises medium access control (MAC) messages multiplexing radio resource control (RRC) messages using one or more logical channel identifiers (LCIDs) or cell radio network temporary identifiers (C-RNTIs) MAC control elements.

6. The apparatus of claim 5, wherein each RRC message in the multiplexed RRC messages is based on a signaling radio bearer (SRB) configuration and access stratum (AS) key of a UE in the group of UEs, and wherein the SRB configuration is specific to the UE or comprises a default radio bearer configuration.

7. The apparatus of claim 5, wherein each RRC message in the multiplexed RRC messages includes a delta configuration based on default UE configuration for the target base station.

8. The apparatus of claim 5, wherein a size of the group of UEs is based on an amount of the multiplexed RRC messages allowed in a single transport block signal (TBS).

9. The apparatus of claim 1, wherein the group handover message is transmitted in a groupcast message, and wherein the groupcast message is transmitted at a specified or pre-defined time or location for the group of UEs.

10. The apparatus of claim 9, wherein the at least one processor coupled to the memory is further configured to:
   transmit an indication to one or more UEs of the group of UEs when to check the groupcast message.

11. The apparatus of claim 9, wherein the groupcast message is encrypted using a group common security key for the group of UEs.

12. The apparatus of claim 1, wherein the at least one processor coupled to the memory is further configured to:
   provide configuration information for each UE in the group of UEs,
   wherein the configuration information for a UE in the group of UEs indicates a change in one or more configuration parameters for the UE relative to a common configuration for the target base station,
   wherein the common configuration for the target base station comprises a default configuration for the target base station applicable to each UE in the group of UEs or a full configuration for the target base station,
   wherein the configuration information is provided to the group of UEs in the group handover message or in a downlink message prior to a handover decision.

13. The apparatus of claim 1, wherein the group handover message one or more of: an indication to continue to use a current source cell configuration with the target base station, a new security key for communication with the target base station, a next hop chaining counter (NCC) and a cell radio network temporary identifier (C-RNTI) for the target base station, a new round trip delay (RTD) value for the target base station, or a new timing advance (TA) for the target base station.

14. An apparatus for wireless communication at a user equipment (UE) served by a source base station, comprising:
   memory; and
   at least one processor coupled to the memory and configured to:
      receive a group handover message comprising radio resource control (RRC) configuration for one or more UEs transmitted to a group of UEs comprising the one or more UEs from the source base station in a cell specific common search space, and wherein at least a portion of the group handover message is scrambled with a cell specific group radio network temporary identifier (RNTI); and
      connect to a target base station using the RRC configuration based on the group handover message.

15. The apparatus of claim 14, wherein the source base station is configured to communicate with the group of UEs via a satellite.

16. The apparatus of claim 14, wherein the group handover message comprises an RRC message comprising a list of RRC reconfiguration messages for each UE in the group of UEs, and wherein an RRC reconfiguration message in the list of RRC reconfiguration messages indicates a difference with respect to a current configuration for a respective UE.

17. The apparatus of claim 16, wherein the at least one processor coupled to the memory is further configured to:
receive, from the source base station, a common access stratum (AS) key and a group specific or default SRB configuration that is common to the group of UEs.

18. The apparatus of claim 17, wherein new signaling radio bearer (SRB) information in the group handover message includes integrity protection and cyphering based on the common AS key and a group specific new SRB configuration.

19. The apparatus of claim 14, wherein the RRC configuration comprises an RRC message comprising a list of RRC reconfiguration messages for each UE in the group of UEs, and wherein an RRC reconfiguration message in the list of RRC reconfiguration messages that is for the UE indicates one or more different parameters with respect to a current configuration for the UE.

20. The apparatus of claim 14, wherein the group handover message comprises a medium access control (MAC) message multiplexing radio resource control (RRC) messages using one or more logical channel identifiers (LCIDs) or cell radio network temporary identifiers (C-RNTIs) MAC control elements.

21. The apparatus of claim 20, wherein the at least one processor coupled to the memory is further configured to decode one RRC message in the multiplexed RRC messages that is directed to the UE.

22. The apparatus of claim 21, wherein the at least one processor coupled to the memory is further configured to use a current UE specific signaling radio bearer 1 (SRB1) and access stratum (AS) security profile to attempt to decode the multiplexed RRC messages to determine an RRC message intended for the UE.

23. The apparatus of claim 21, wherein the at least one processor coupled to the memory is further configured to use a default signaling radio bearer 1 (SRB1) to attempt to decode the multiplexed RRC messages.

24. The apparatus of claim 21, wherein the one RRC message that is directed to the UE from the multiplexed RRC messages includes a delta configuration based on default UE configuration for the target base station.

25. The apparatus of claim 14, wherein the at least one processor coupled to the memory is further configured to receive the group handover message in a groupcast message.

26. The apparatus of claim 25, wherein the at least one processor coupled to the memory is further configured to:
check the groupcast message for the group handover message based on a specified or pre-defined time or a location.

27. The apparatus of claim 25, wherein the at least one processor coupled to the memory is further configured to:
receive an indication from the source base station about the groupcast message, wherein the UE receives the group handover message in the groupcast message in response to receiving the indication.

28. The apparatus of claim 14, wherein the group handover message comprises an indication to continue to use a current source cell configuration with the target base station, and wherein the at least one processor coupled to the memory is further configured to:
receive system information comprising common configuration and pre-compensation value for the target base station before connecting to the target base station if information is not provided in handover message.

29. The apparatus of claim 14, further comprising a transceiver or an antenna coupled to the at least one processor.

* * * * *